United States Patent
Ahn et al.

(10) Patent No.: US 9,472,343 B2
(45) Date of Patent: Oct. 18, 2016

(54) MULTILAYER CERAMIC CAPACITOR AND BOARD HAVING THE SAME

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Young Key Kim, Suwon-Si (KR); Byoung Hwa Lee, Suwon-Si (KR); Min Cheol Park, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 172 days.

(21) Appl. No.: 14/526,473

(22) Filed: Oct. 28, 2014

(65) Prior Publication Data

US 2016/0027582 A1  Jan. 28, 2016

(30) Foreign Application Priority Data

Jul. 28, 2014  (KR) ........................ 10-2014-0095979

(51) Int. Cl.
| | | |
|---|---|---|
| *H01G 4/30* | (2006.01) | |
| *H01G 4/12* | (2006.01) | |
| *H01G 4/012* | (2006.01) | |
| *H01G 2/06* | (2006.01) | |
| *H01G 4/232* | (2006.01) | |

(52) U.S. Cl.
CPC ............... *H01G 4/30* (2013.01); *H01G 2/065* (2013.01); *H01G 4/012* (2013.01); *H01G 4/232* (2013.01); *H01G 4/12* (2013.01)

(58) Field of Classification Search
CPC .......... H01G 4/30; H01G 4/12; H01G 4/012; H01G 2/065
See application file for complete search history.

(56) References Cited

U.S. PATENT DOCUMENTS 4,720,767 A * 1/1988 Chan ...................... H01G 4/255
361/275.4
6,587,327 B1 * 7/2003 Devoe .................... H01G 4/228
361/306.3

(Continued)

FOREIGN PATENT DOCUMENTS

JP    2003-007568 A    1/2003
JP    2013-502746 A    1/2013

(Continued)

*Primary Examiner* — Jeremy C Norris
*Assistant Examiner* — Nathan Milakovich
(74) *Attorney, Agent, or Firm* — McDermott Will & Emery LLP (57) ABSTRACT

A multilayer ceramic capacitor may include: a ceramic body; first and second external electrodes disposed on a mounting surface of the ceramic body; third and fourth external electrodes disposed on a surface of the ceramic body opposing the mounting surface; a first active layer including first and second internal electrodes alternately exposed through the mounting surface of the ceramic body and the surface of the ceramic body opposing the mounting surface and connected to the first and third external electrodes, respectively; a second active layer including third and fourth internal electrodes alternately exposed through the mounting surface of the ceramic body and the surface of the ceramic body opposing the mounting surface and connected to the second and fourth external electrodes, respectively; and an intermittent part disposed on the surface of the ceramic body opposing the mounting surface and connecting the third and fourth external electrodes to each other.

18 Claims, 6 Drawing Sheets

(56) References Cited

U.S. PATENT DOCUMENTS

| | | | | |
|---|---|---|---|---|
| 6,768,630 | B2* | 7/2004 | Togashi | H01G 4/232 361/302 |
| 7,164,573 | B1* | 1/2007 | Prymak | H01G 2/16 361/306.1 |
| 7,595,973 | B1* | 9/2009 | Lee | H01G 4/005 361/303 |
| 7,701,695 | B2* | 4/2010 | Sutardja | H01G 4/232 361/306.3 |
| 7,961,453 | B2* | 6/2011 | Lee | H01G 4/012 361/303 |
| 8,264,816 | B2* | 9/2012 | Bultitude | H01G 2/16 361/321.4 |
| 9,024,206 | B2* | 5/2015 | Park | H01G 4/30 174/260 |
| 9,123,474 | B2* | 9/2015 | Park | H01G 4/385 |
| 9,171,672 | B2* | 10/2015 | McConnell | H01G 4/232 |
| 9,240,281 | B2* | 1/2016 | Park | H01G 4/385 |
| 9,257,230 | B2* | 2/2016 | Park | H01G 2/14 |
| 2003/0231457 | A1* | 12/2003 | Ritter | H01C 1/14 361/306.3 |
| 2009/0168298 | A1* | 7/2009 | Togashi | H01G 4/012 361/306.3 |
| 2012/0162853 | A1* | 6/2012 | Togashi | H01G 4/005 361/301.4 |
| 2014/0022696 | A1* | 1/2014 | Banno | H01G 4/30 361/301.4 |
| 2015/0116892 | A1* | 4/2015 | Park | H01G 4/40 361/275.3 |
| 2015/0131194 | A1* | 5/2015 | Park | H01G 4/40 361/275.3 |
| 2015/0131196 | A1* | 5/2015 | Park | H01G 4/40 361/275.3 |
| 2015/0325370 | A1* | 11/2015 | Lee | H01G 4/008 361/275.3 |
| 2015/0348711 | A1* | 12/2015 | Kim | H01G 4/1227 174/260 |
| 2016/0050759 | A1* | 2/2016 | Park | H05K 1/181 174/260 |
| 2016/0086731 | A1* | 3/2016 | Park | H01G 2/065 174/260 |
| 2016/0111214 | A1* | 4/2016 | Park | H01G 2/065 174/260 |
| 2016/0118187 | A1* | 4/2016 | Ahn | H01G 2/16 361/301.4 |

FOREIGN PATENT DOCUMENTS

| | | | |
|---|---|---|---|
| JP | 2013171970 A | * | 9/2013 |
| KR | 20020074124 A | * | 9/2002 |
| WO | 2011/028551 A2 | | 3/2011 |

* cited by examiner

MULTILAYER CERAMIC CAPACITOR AND BOARD HAVING THE SAME

CROSS-REFERENCE TO RELATED APPLICATION

This application claims the benefit of Korean Patent Application No. 10-2014-0095979 filed on Jul. 28, 2014, with the Korean Intellectual Property Office, the disclosure of which is incorporated herein by reference.

BACKGROUND

The present disclosure relates to a multilayer ceramic capacitor (MLCC) and a board having the same.

A multilayer ceramic capacitor, a multilayer chip electronic component, is a chip-type condenser mounted on boards of various electronic products such as display devices including liquid crystal displays (LCDs), plasma display panels (PDPs), and the like, computers, personal digital assistants (PDAs), smart phones, mobile phones, and the like, to charge and discharge electricity.

Since multilayer ceramic capacitors (MLCCs) have advantages such as a relatively small size, high capacitance, ease of mounting, and the like, multilayer ceramic capacitors may be used as components in various electronic devices.

A short-circuit may occur in the multilayer ceramic capacitor due to short-circuits between internal electrodes, electrical overloads, or the like.

In this case, an over-current may be transferred to circuits connected to the multilayer ceramic capacitor, causing damage to an overall product connected to the multilayer ceramic capacitor.

Related Art Document (Patent Document 1) Japanese Patent Laid-Open Publication No. 2013-502746
(Patent Document 2) Japanese Patent Laid-Open Publication No. 2003-7568

SUMMARY

An exemplary embodiment in the present disclosure may provide a novel method for preventing an over-current flowing in a multilayer ceramic capacitor from damaging an overall product connected to the multilayer ceramic capacitor by opening a circuit in a case in which a short-circuit occurs in the multilayer ceramic capacitor.

According to an exemplary embodiment in the present disclosure, a multilayer ceramic capacitor may include: a ceramic body having a plurality of dielectric layers stacked therein in a width direction; first and second external electrodes formed on a mounting surface of the ceramic body to be spaced apart from each other in a length direction; third and fourth external electrodes formed on a surface of the ceramic body opposing the mounting surface to be spaced apart from each other in the length direction; a first active layer including a plurality of first and second internal electrodes disposed in the ceramic body to be alternately exposed through the mounting surface of the ceramic body and the surface of the ceramic body opposing the mounting surface with respective dielectric layers interposed therebetween and connected to the first and third external electrodes, respectively; a second active layer including a plurality of third and fourth internal electrodes disposed in the ceramic body to be alternately exposed through the mounting surface of the ceramic body and the surface of the ceramic body opposing the mounting surface with respective dielectric layers interposed therebetween and connected to the second and fourth external electrodes, respectively; and an intermittent part formed on the surface of the ceramic body opposing the mounting surface and connecting the third and fourth external electrodes to each other.

The first and second internal electrodes may include lead portions exposed through the mounting surface of the ceramic body and the surface of the ceramic body opposing the mounting surface, respectively, to correspond to each other in a thickness direction of the ceramic body, and the third and fourth internal electrodes may include lead portions spaced apart from the lead portions of the first and second internal electrodes in the length direction and exposed through the mounting surface of the ceramic body and the surface of the ceramic body opposing the mounting surface, respectively, to correspond to each other in the thickness direction of the ceramic body.

The first and third external electrodes and the second and fourth external electrodes may face each other in the thickness direction, respectively, the first internal electrode may include a first capacitance portion and a first lead portion extended from the first capacitance portion to be connected to the first external electrode, the second internal electrode may include a second capacitance portion overlapped with the first capacitance portion in the width direction and a second lead portion extended from the second capacitance portion to be connected to the third external electrode, the third internal electrode may include a third capacitance portion and a third lead portion extended from the third capacitance portion to be connected to the second external electrode, and the fourth internal electrode may include a fourth capacitance portion overlapped with the third capacitance portion in the width direction and a fourth lead portion extended from the fourth capacitance portion to be connected to the fourth external electrode.

The first and second internal electrodes may include lead portions exposed through the mounting surface of the ceramic body and the surface of the ceramic body opposing the mounting surface, respectively, in positions adjacent to corners positioned diagonally on a cross-section of the ceramic body in a length-thickness direction, the third and fourth internal electrodes may include lead portions exposed through the mounting surface of the ceramic body and the surface of the ceramic body opposing the mounting surface, respectively, in positions adjacent to corners positioned diagonally on the cross-section of the ceramic body in the length-thickness direction, and the lead portion of the first internal electrode and the lead portion of the fourth internal electrode may be positioned to correspond to each other in a thickness direction of the ceramic body and the lead portion of the second internal electrode and the lead portion of the third internal electrode may be positioned to correspond to each other in the thickness direction of the ceramic body.

The first and third external electrodes and the second and fourth external electrodes may face each other in the thickness direction, respectively, the first internal electrode may include a first capacitance portion and a first lead portion extended from the first capacitance portion to be connected to the second external electrode, the second internal electrode may include a second capacitance portion overlapped with the first capacitance portion in the width direction and a second lead portion extended from the second capacitance portion to be connected to the third external electrode, the third internal electrode may include a third capacitance portion and a third lead portion extended from the third capacitance portion to be connected to the first external electrode, and the fourth internal electrode may include a fourth capacitance portion overlapped with the third capacitance portion in the width direction and a fourth lead portion extended from the fourth capacitance portion to be connected to the fourth external electrode.

The intermittent part may be a fuse or a resistive pattern.

The first to fourth internal electrodes may be spaced apart from both end surfaces of the ceramic body in the length direction.

The first to fourth external electrodes maybe extended from the mounting surface of the ceramic body or the surface of the ceramic body opposing the mounting surface to portions of both side surfaces of the ceramic body in the width direction.

According an exemplary embodiment in the present disclosure, a board having a multilayer ceramic capacitor may include: a printed circuit board having first and second electrode pads disposed thereon; and the multilayer ceramic capacitor mounted on the printed circuit board.

BRIEF DESCRIPTION OF DRAWINGS

The above and other aspects, features and advantages in the present disclosure will be more clearly understood from the following detailed description taken in conjunction with the accompanying drawings, in which.

DETAILED DESCRIPTION

Hereinafter, embodiments in the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements maybe exaggerated for clarity, and the same reference numerals will be used throughout to designate the same or like elements.

Hereinafter, directions of a hexahedron will be defined in order to clearly describe exemplary embodiments in the present disclosure. L, W and T, as illustrated in the accompanying drawings, refer to a length direction, a width direction, and a thickness direction, respectively.

Multilayer Ceramic Capacitor

Figure 1:
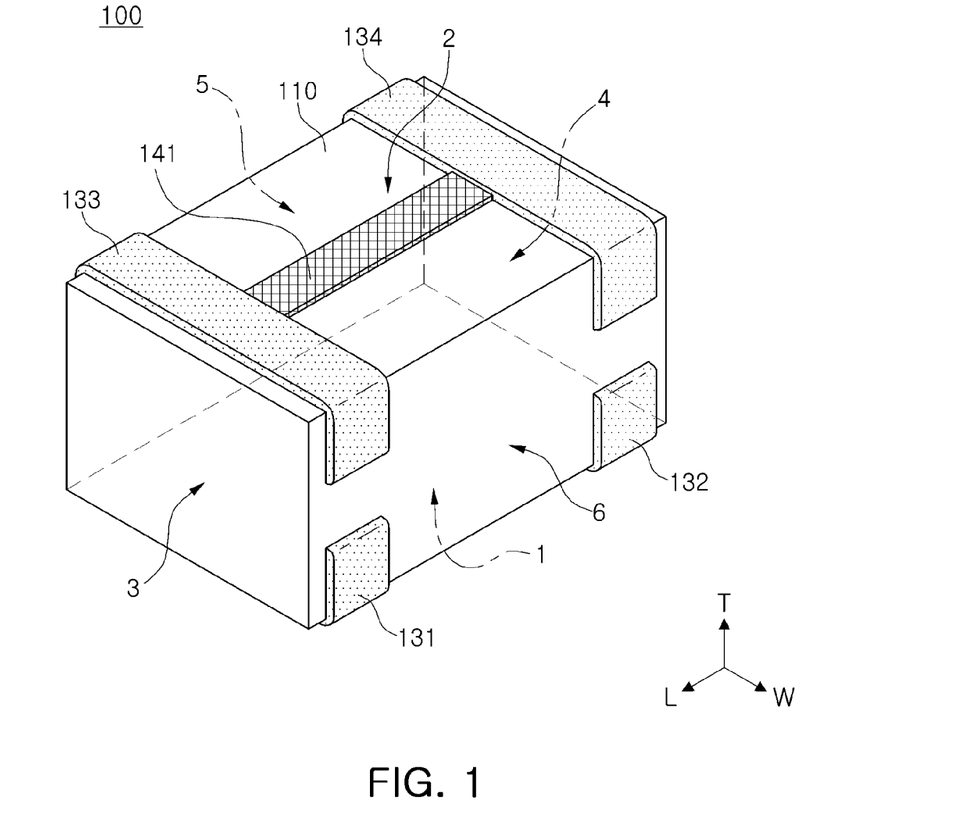
FIG. 1 is a perspective view schematically illustrating a multilayer ceramic capacitor according to an exemplary embodiment in the present disclosure.
Figure 2:
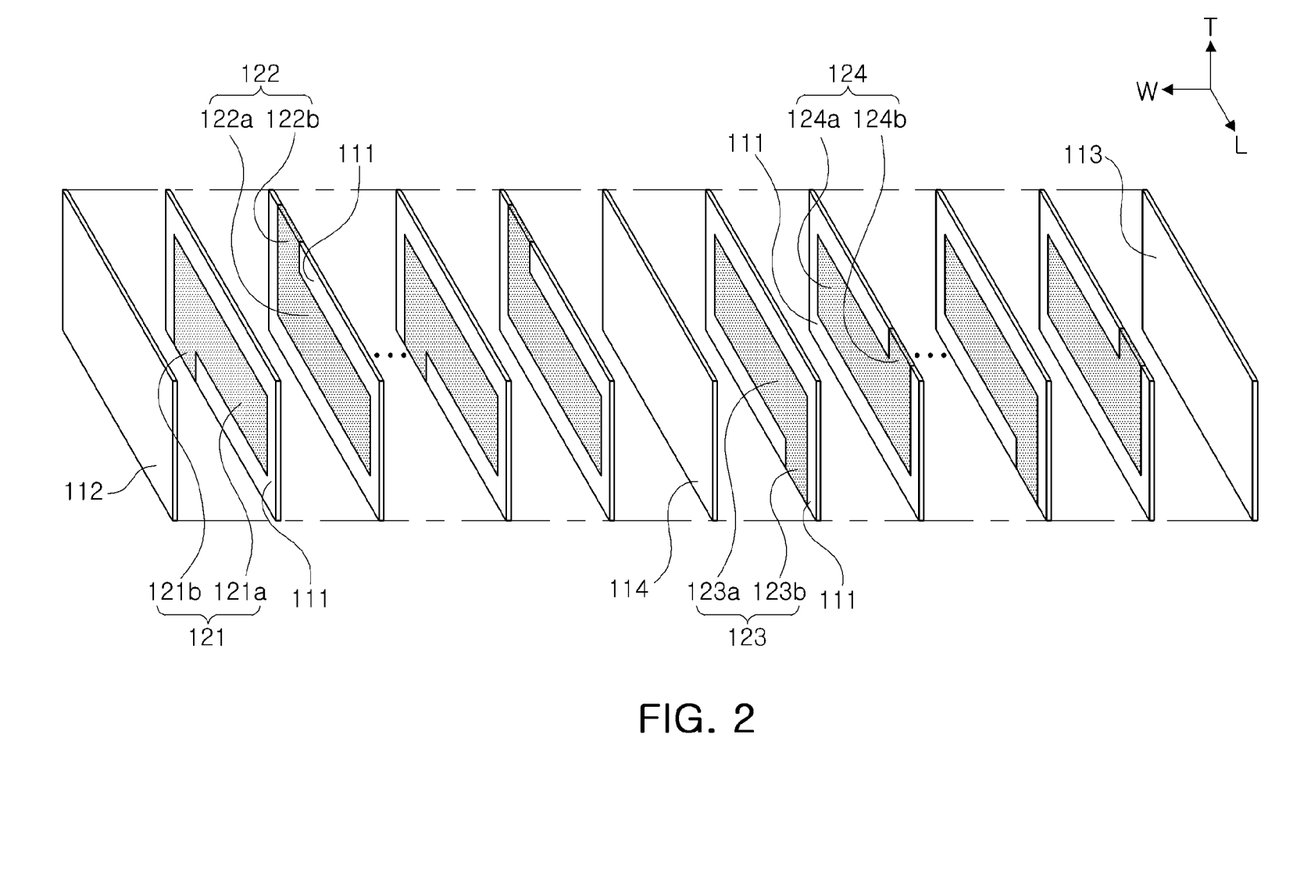
FIG. 2 is an exploded perspective view illustrating a multilayer structure of first to fourth internal electrodes in the multilayer ceramic capacitor according to an exemplary embodiment in the present disclosure.

FIG. 1 is a perspective view schematically illustrating a multilayer ceramic capacitor according to an exemplary embodiment in the present disclosure; FIG. 2 is an exploded perspective view illustrating a multilayer structure of first to fourth internal electrodes of the multilayer ceramic capacitor according to an exemplary embodiment in the present disclosure; and FIG. 3 is a perspective view illustrating first and second active layers divided within the multilayer ceramic capacitor according to an exemplary embodiment in the present disclosure.

Figure 3:
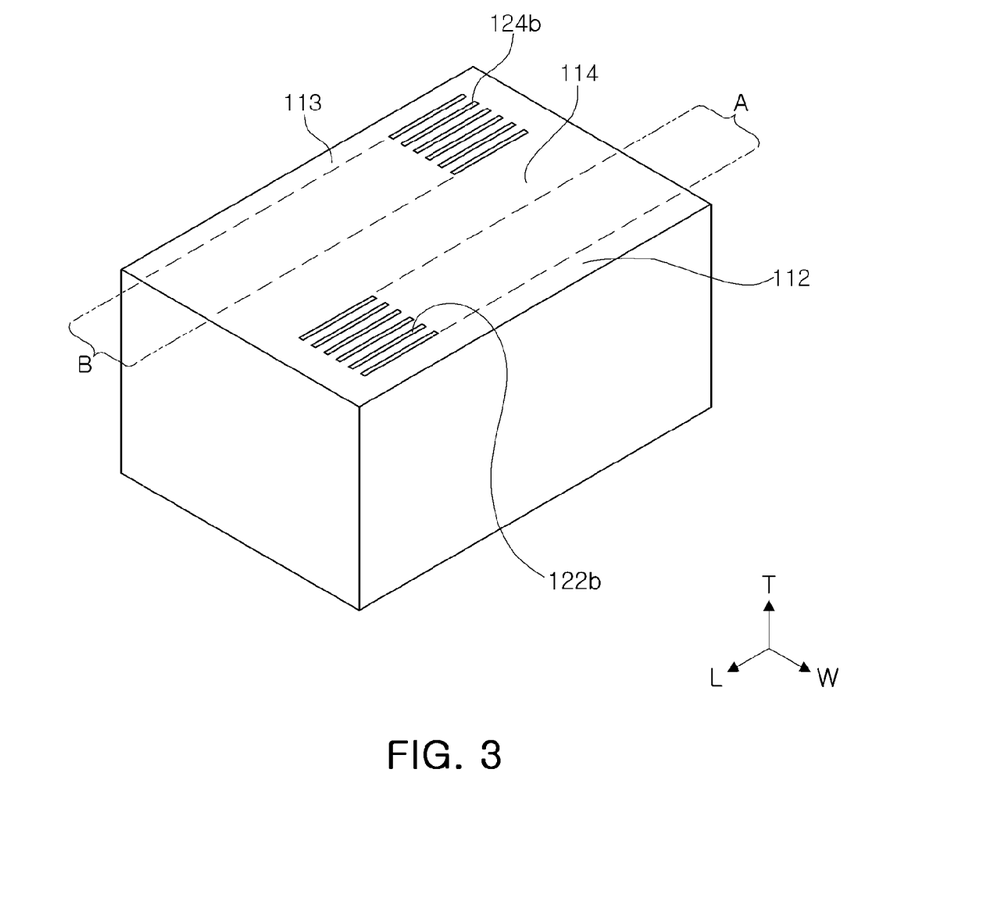
FIG. 3 is a perspective view illustrating first and second active layers divided within the multilayer ceramic capacitor according to an exemplary embodiment in the present disclosure.

Referring to FIGS. 1 through 3, a multilayer ceramic capacitor 100 according to an exemplary embodiment in the present disclosure may have a vertically laminated structure. The multilayer ceramic capacitor 100 according to the present exemplary embodiment may include a ceramic body 110, first and second external electrodes 131 and 132 formed on a mounting surface of the ceramic body 110 to be spaced apart from each other in a length direction, third and fourth external electrodes 133 and 134 formed on a surface of the ceramic body 110 opposing the mounting surface of the ceramic body 110 to be spaced apart from each other in the length direction, a first active layer A including a plurality of first and second internal electrodes 121 and 122, a second active layer B including a plurality of third and fourth internal electrodes 123 and 124, and an intermittent part 141. In addition, cover layers 112 and 114 may be disposed on sides of the first and second active layers A and B and a cover layer 113 may be interposed between the first and second active layers A and B.

The ceramic body 110 may be formed by stacking a plurality of dielectric layers 111 in a thickness direction and then sintering the plurality of dielectric layers 111.

However, shapes and dimensions of the ceramic body 110 and the number of stacked dielectric layers 111 included therein are not limited to those of the present exemplary embodiment illustrated in FIGS. 1 and 2.

Here, the plurality of dielectric layers 111 forming the ceramic body 110 may be in a sintered state.

Therefore, adjacent dielectric layers 111 may be integrated with each other, such that boundaries therebetween may not be readily apparent without the use of a scanning electron microscope (SEM).

The ceramic body 110 may have a hexahedral shape.

In the exemplary embodiment in the present disclosure, first and second main surfaces 1 and 2 refer to surfaces of the ceramic body 110 opposing each other in a thickness direction, first and second end surfaces 3 and 4 refer to surfaces of the ceramic body 110 connecting the first and second main surfaces 1 and 2 to each other and opposing each other in a length direction, and first and second side surfaces 5 and 6 refer to surfaces of the ceramic body 110 opposing each other in a width direction.

Hereinafter, in the present exemplary embodiment, a description will be provided on the assumption that a mounting surface of the multilayer ceramic capacitor 100 is the first main surface 1 of the ceramic body 110.

The ceramic body 110 may include the first and second active layers A and B and the cover layers 112 to 114.

The first and second active layers A and B may be divided within the ceramic body 110 in the width direction, based on a virtual separation line C of FIG. 3.

The first active layer A, contributing to capacitance formation in the multilayer ceramic capacitor, may be a part of the ceramic body 110 in which the plurality of first and second internal electrodes 121 and 122 are stacked.

The second active layer B, contributing to capacitance formation in the multilayer ceramic capacitor, may be a part of the ceramic body 110 in which the plurality of third and fourth internal electrodes 123 and 124 are stacked.

The cover layers 112 to 114 may be formed of the same material and configuration as those of the dielectric layers 111 of the first and second active layers A and B except that they do not include the internal electrodes.

In addition, the cover layers 112 to 114 may be formed by stacking a single dielectric layer or two or more dielectric layers on an outer side surface of the first active layer A, on an outer side surface of the second active layer B, and between the first and second active layers A and B.

The cover layers 112 to 114 may serve to prevent the first to fourth internal electrodes 121 to 124 from being damaged by physical or chemical stress.

The dielectric layers 111 may contain a high-k ceramic material.

The dielectric layers 111 may contain, for example, a barium titanate ($BaTiO_3$)-based ceramic powder, or the like. However, the material of the dielectric layer is not limited thereto, as long as a sufficient degree of capacitance may be obtained.

In addition, the dielectric layers 111 may further contain a ceramic additive, an organic solvent, a plasticizer, a binder, a dispersant, and the like, if necessary, in addition to the ceramic material.

Here, as the ceramic additive, various kinds of materials such as a transition metal oxide or carbide, rare earth elements, magnesium (Mg), aluminum (Al), and the like, may be used.

The plurality of first and second internal electrodes 121 and 122, having different polarities, may be alternately disposed in the width direction within the first active layer A of the ceramic body 110 with respective dielectric layers 111 interposed therebetween.

Here, the plurality of first and second internal electrodes 121 and 122 may be electrically insulated from each other by the dielectric layers 111 disposed therebetween.

In addition, the first and second internal electrodes 121 and 122 may be exposed through the first main surface 1, the mounting surface of the ceramic body 110, and the second main surface 2, the surface of the ceramic body 110 opposing the mounting surface thereof, respectively, to correspond to each other in the length direction of the ceramic body 110.

The first internal electrode 121 may include a first capacitance portion 121a overlapped with the second internal electrode 122 and forming capacitance and a first lead portion 121b extended from the first capacitance portion 121a toward the first main surface 1 of the ceramic body 110 to be led-out through the first main surface 1 of the ceramic body 110.

The second internal electrode 122 may include a second capacitance portion 122a overlapped with the first capacitance portion 121a of the first internal electrode 121 in the width direction and forming capacitance and a second lead portion 122b extended from the second capacitance portion 122a toward the second main surface 2 of the ceramic body 110 to be led-out through the second main surface 2 of the ceramic body 110.

Here, capacitance of the first active layer A of the multilayer ceramic capacitor 100 may be in proportion to an area of a region in which is overlapped with the first and second capacitance portions 121a and 122a of the first and second internal electrodes 121 and 122 are overlapped with each other in the width direction.

The first and second internal electrodes 121 and 122 may be formed by printing a conductive paste containing a conductive metal on at least one surface of ceramic sheets forming the dielectric layers 111.

The conductive metal contained in the conductive paste may be one of, for example, silver (Ag), palladium (Pd), platinum (Pt), nickel (Ni), and copper (Cu), an alloy thereof, or the like. However, the conductive metal is not limited thereto.

In addition, as a method of printing the conductive paste, a screen printing method, a gravure printing method, or the like, may be used. However, the printing method is not limited thereto.

The plurality of third and fourth internal electrodes 123 and 124, having different polarities, may be alternately disposed in the width direction within the second active layer B of the ceramic body 110 with respective dielectric layers 111 interposed therebetween.

Here, the plurality of third and fourth internal electrodes 123 and 124 may be electrically insulated from each other by the dielectric layers 111 disposed therebetween.

In addition, the third and fourth internal electrodes 123 and 124 may be exposed through the first main surface 1, the mounting surface of the ceramic body 110, and the second main surface 2, the surface of the ceramic body 110 opposing the mounting surface thereof, respectively, to correspond to each other in the thickness direction of the ceramic body 110, in a state in which the exposed portions of the third and fourth internal electrodes 123 and 124 are spaced apart from the exposed portions of the first and second internal electrodes 121 and 122 in the length direction.

The third internal electrode 123 may include a third capacitance portion 123a overlapped with the fourth internal electrode 124 and forming capacitance and a third lead portion 123b extended from the third capacitance portion 123a toward the first main surface 1 of the ceramic body 110 to be led-out through the first main surface 1 of the ceramic body 110.

The fourth internal electrode 124 may include a fourth capacitance portion 124a overlapped with the third capacitance portion 123a of the third internal electrode 123 in the width direction and forming capacitance and a fourth lead portion 124b extended from the fourth capacitance portion 124a toward the second main surface 2 of the ceramic body 110 to be led-out through the second main surface 2 of the ceramic body 110.

Here, capacitance of the second active layer B of the multilayer ceramic capacitor 100 may be in proportion to an area of a region in which are overlapped with the third and fourth capacitance portions 123a and 124a of the third and fourth internal electrodes 123 and 124 are overlapped with each other in the width direction.

In addition, a total capacitance of the multilayer ceramic capacitor 100 may be (the capacitance of the first active layer A×the capacitance of the second active layer B)/(the capacitance of the first active layer A+the capacitance of the second active layer B).

The third and fourth internal electrodes 123 and 124 may be formed by printing a conductive paste containing a conductive metal on at least one surfaces of ceramic sheets forming the dielectric layers 111.

The conductive metal contained in the conductive paste may be one of, for example, silver (Ag), palladium (Pd), platinum (Pt), nickel (Ni), and copper (Cu), an alloy thereof, or the like. However, the conductive metal is not limited thereto.

In addition, as a method of printing the conductive paste, a screen printing method, a gravure printing method, or the like, may be used. However, the printing method is not limited thereto.

The first and second external electrodes 131 and 132 may be formed on the first main surface 1 of the ceramic body 110 to be spaced apart from each other in the length direction. The first external electrode 131 may be connected to the first lead portion 121b of the first internal electrode 121, and the second external electrode 132 may be connected to the third lead portion 123b of the third internal electrode 123.

The third and fourth external electrodes 133 and 134 may be formed on the second main surface 2 of the ceramic body 110 to be spaced apart from each other in the length direction. The third external electrode 133 may be connected to the second lead portion 122b of the second internal electrode 122, and the fourth external electrode 134 may be connected to the fourth lead portion 124b of the fourth internal electrode 124.

The first and second external electrodes 131 and 132 may be extended from the first main surface 1 of the ceramic body 110 to portions of the first and second side surfaces 5 and 6 of the ceramic body 110 in order to improve adhesive strength.

The third and fourth external electrodes 133 and 134 may be extended from the second main surface 2 of the ceramic body 110 to portions of the first and second side surfaces 5 and 6 of the ceramic body 110 in order to improve adhesive strength.

In the multilayer ceramic capacitor 100 having the above-described electrode structure, since lengths between the first and second external electrodes 131 and 132 and between the third and fourth external electrodes 133 and 134 are relatively short, a current path may be reduced. Therefore, a current loop may be decreased, leading to a reduction in equivalent series inductance (ESL).

In addition, in the present exemplary embodiment, the first and second active layers A and B are connected to each other in series through the first to fourth external electrodes 131 to 134, whereby even in the case that a short-circuit occurs in one of the first and second active layers, the other of the first and second active layers may be able to operate normally.

The first to fourth external electrodes 131 to 134 may be formed of a conductive paste containing a conductive metal.

The conductive metal may be one of, for example, nickel (Ni), copper (Cu), and tin (Sn), an alloy thereof, or the like, but is not limited thereto.

The conductive paste may further include an insulating material.

The insulating material may be, for example, glass, but is not limited thereto.

Further, in the present disclosure, a method of forming the first to fourth external electrodes 131 to 134 is not particularly limited. That is, several methods such as a method of forming the first to fourth external electrodes 131 to 134 by dipping the ceramic body 110 in a conductive paste, a method of forming the first to fourth external electrodes 131 to 134 by plating, and the like, may be used.

Meanwhile, a plating layer (not shown) may be further formed on the first to fourth external electrodes 131 to 134 by an electroplating method, or the like.

The plating layer may include a nickel (Ni) plating layer formed on the first to fourth external electrodes 131 to 134 and a tin (Sn) plating layer formed on the nickel plating layer.

The plating layer is to increase adhesion strength between the multilayer ceramic capacitor 100 and a board when the multilayer ceramic capacitor 100 is mounted on the board, or the like, using solders.

The intermittent part 141 may be formed on the second main surface 2, the surface of the ceramic body 110 opposing the mounting surface thereof, may serve to connect the third and fourth external electrodes 133 and 134 to each other on the second main surface 2 of the ceramic body 110.

The intermittent part 141 maybe short-circuited in the case that a short-circuit occurs due to short-circuit between the internal electrodes, electrical overload, or the like, thereby opening a circuit. Therefore, the intermittent part 141 may prevent an over-current generated in the multilayer ceramic capacitor 100 from being transferred to remaining circuits connected to the multilayer ceramic capacitor 100, thereby avoiding damage to an overall product.

Here, the intermittent part 141 may be a fuse, a resistive pattern, or the like, but is not limited thereto.

Figure 4A:
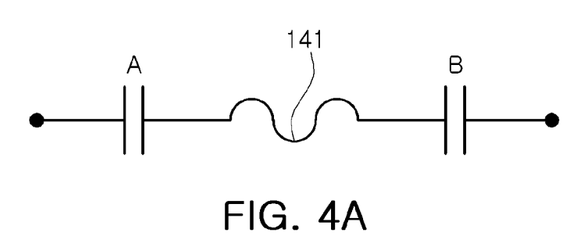
FIGS. 4A and 4B are circuit diagrams illustrating examples of an equivalent circuit of the multilayer ceramic capacitor of FIG. 1, respectively.

In FIG. 4A, which illustrates an equivalent circuit of the multilayer ceramic capacitor 100 according to an exemplary embodiment in the present disclosure, a fuse may be used as the intermittent part 141.

The fuse, which serves to prevent an over-current, needs to have a resistance value sufficient to be disconnected by heat generated in the case in which an over-current of a predetermined level or more is generated. The resistance value of the fuse may be determined depending on, for example, a reference value of a current applied to the capacitor.

Figure 4B:
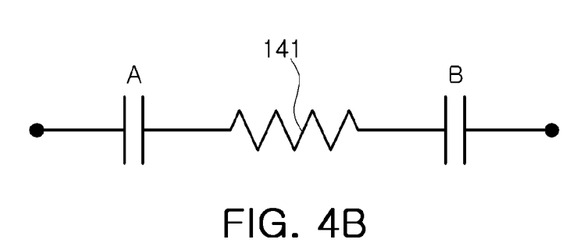

In FIG. 4B, which illustrates an equivalent circuit of the multilayer ceramic capacitor 100 according to an exemplary embodiment in the present disclosure, a resistive pattern may be used as the intermittent part 141.

The resistive pattern may include one of a resistor, a varistor, and a thermistor, but is not limited thereto.

The resistive pattern may be used in order to adjust an equivalent series resistance (ESR) value to a required level, for example, in the case in which it is required for the multilayer ceramic capacitor to have a high ESR value in order to prevent radiation noise or decrease a voltage variation at a specific frequency.

Here, a resistance value of the resistive pattern is not limited, but may be variously set to, for example, several hundred mΩ to several Ω.

In the case in which a short-circuit occurs in the multilayer ceramic capacitor 100, an over-current may be transferred to remaining circuits connected to the multilayer ceramic capacitor 100, causing damage to an overall product connected to the multilayer ceramic capacitor 100.

In the present exemplary embodiment, the first external electrode 131 connected to the first lead portion 121b of the first internal electrode 121 may have a positive electrode applied thereto, and the second external electrode 132 connected to the third lead portion 123b of the third internal electrode 123 may have a negative electrode applied thereto.

When power is applied to the multilayer ceramic capacitor, a current path may move from the first external electrode 131, the positive electrode, to the third external electrode 133 through the first and second internal electrodes 121 and 122 of the first active layer A, move to the second active layer B through the intermittent part 141, and then move to the second external electrode 132, the negative electrode, through the third and fourth internal electrodes 123 and 124 of the second active layer B.

Therefore, according to the present exemplary embodiment, since the current path is lengthened and current passes through a resistor having a narrow width, an ESL increase effect may be anticipated.

In addition, the intermittent part 141 connecting the third and fourth external electrodes 133 and 134 to each other may be formed on the second main surface 2 of the ceramic body 110. In the case in which a short-circuit occurs in the multilayer ceramic capacitor 100, the intermittent part 141 may be short-circuited to allow the circuit to be left in an open state, thereby preventing the over-current from being transferred to the remaining circuits connected to the multilayer ceramic capacitor 100 to prevent the overall product connected to the multilayer ceramic capacitor 100 from being damaged.

Therefore, in the case in which a short-circuit occurs in the multilayer ceramic capacitor 100, only the multilayer ceramic capacitor 100 may need to be replaced, repaired, and then reused in the overall product.

MODIFIED EXAMPLE

Figure 5:
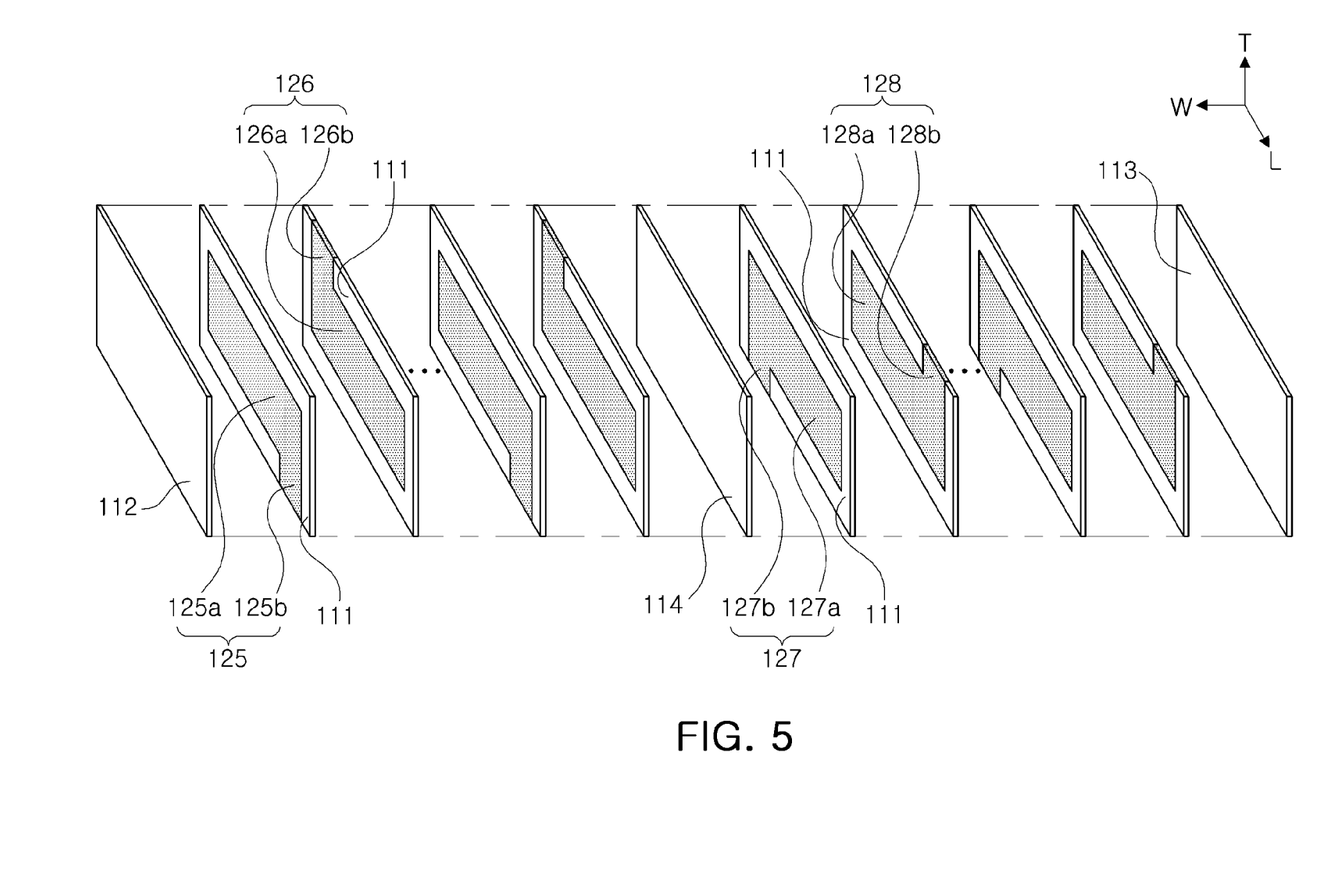
FIG. 5 is an exploded perspective view illustrating a multilayer structure of first to fourth internal electrodes in a multilayer ceramic capacitor according to an exemplary embodiment in the present disclosure.

FIG. 5 is an exploded perspective view illustrating a multilayer structure of first to fourth internal electrodes in a multilayer ceramic capacitor according to another exemplary embodiment in the present disclosure.

Next, a detailed description of structures similar to those of the multilayer ceramic capacitor according to the above-described exemplary embodiment in the present disclosure will be omitted in order to avoid redundancy, and a connection structure between lead portions and external electrodes, different from that of the multilayer ceramic capacitor according to the above-described exemplary embodiment in the present disclosure, will be described in detail.

Referring to FIG. 5, first and second internal electrodes 125 and 126 may be exposed through the first main surface 1, the mounting surface of the ceramic body 110, and the second main surface 2, the surface of the ceramic body 110 opposing the mounting surface of the ceramic body 110, respectively, in positions adjacent to corners positioned diagonally on a cross-section of the ceramic body 110 in a length-thickness direction.

The first internal electrode 125 may include a first capacitance portion 125a overlapped with the second internal electrode 126 and forming capacitance and a first lead portion 125b extended from the first capacitance portion 125a toward the first main surface 1 of the ceramic body 110 to be led-out through the first main surface 1 of the ceramic body 110 and be connected to the second external electrode 132.

The second internal electrode 126 may include a second capacitance portion 126a overlapped with the first capacitance portion 125a of the first internal electrode 125 in the width direction and forming capacitance and a second lead portion 126b extended from the second capacitance portion 126a toward the second main surface 2 of the ceramic body 110 to be led-out through the second main surface 2 of the ceramic body 110 and be connected to the third external electrode 133.

The third and fourth internal electrodes 127 and 128 may be exposed through the first main surface 1, the mounting surface of the ceramic body 110, and the second main surface 2, the surface of the ceramic body 110 opposing the mounting surface of the ceramic body 110, respectively, in positions adjacent to corners positioned diagonally on the cross-section of the ceramic body 110 in the length-thickness direction.

The third internal electrode 127 may include a third capacitance portion 127a overlapped with the fourth internal electrode 128 and forming capacitance and a third lead portion 127b extended from the third capacitance portion 127a toward the first main surface 1 of the ceramic body 110 to be led-out through the first main surface 1 of the ceramic body 110 and be connected to the first external electrode 131.

The fourth internal electrode 128 may include a fourth capacitance portion 128a overlapped with the third capacitance portion 127a of the third internal electrode 127 in the width direction and forming capacitance and a fourth lead portion 128b extended from the fourth capacitance portion 128a toward the second main surface 2 of the ceramic body 110 to be led-out through the second main surface 2 of the ceramic body 110 and be connected to the fourth external electrode 134.

Here, the first lead portion 125b of the first internal electrode 125 and the fourth lead portion 128b of the fourth internal electrode 128 may be exposed through the first and second main surfaces 1 and 2 of the ceramic body 110, respectively, to correspond to each other in the thickness direction of the ceramic body 110.

In addition, the second lead portion 126b of the second internal electrode 126 and the third lead portion 127b of the third internal electrode 127 may be exposed through the first and second main surfaces 1 and 2 of the ceramic body 110, respectively, to correspond to each other in the thickness direction of the ceramic body 110.

Board Having Multilayer Ceramic Capacitor

Figure 6:
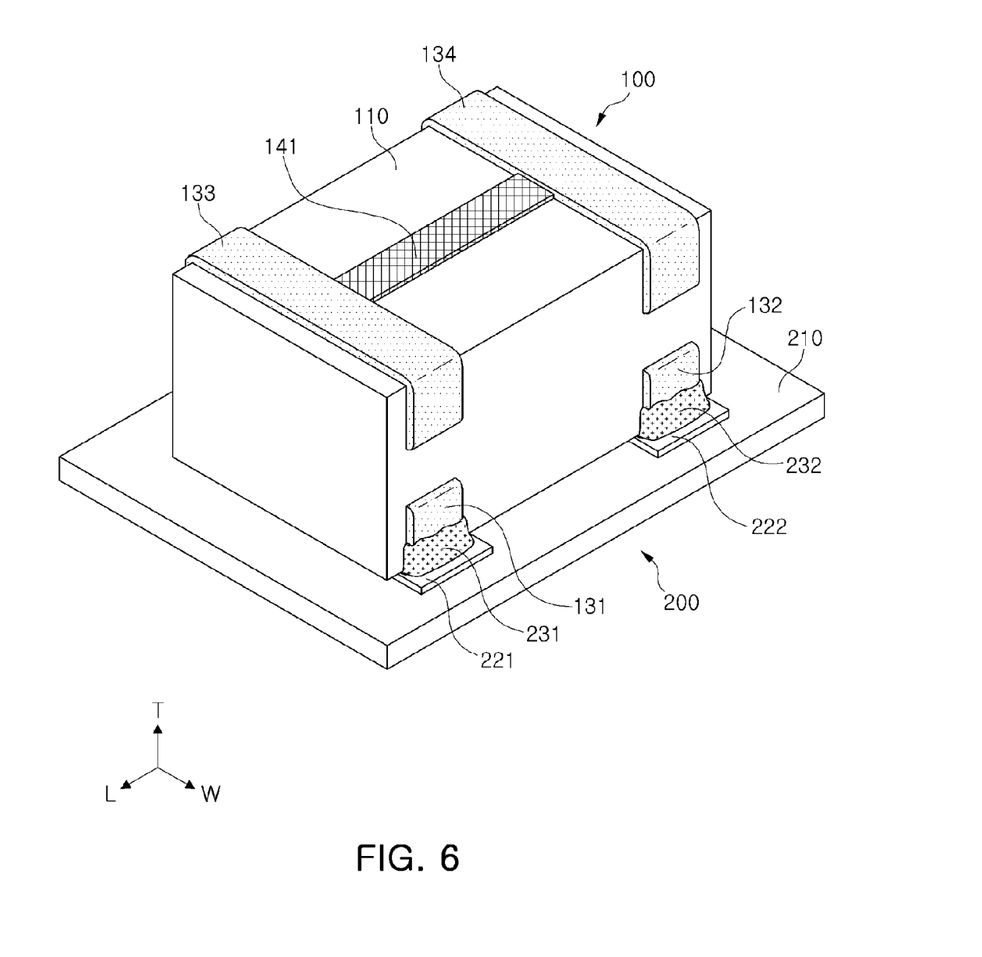
FIG. 6 is a perspective view illustrating a board according to an exemplary embodiment in the present disclosure on which a multilayer ceramic capacitor is mounted.

Referring to FIG. 6, a board 200 having a multilayer ceramic capacitor according to an exemplary embodiment in the present disclosure may include a printed circuit board 210 having the multilayer ceramic capacitor 100 mounted thereon and first and second electrode pads 221 and 222 formed on an upper surface of the printed circuit board 210 to be spaced apart from each other.

Here, the first and second external electrodes 131 and 132 of the multilayer ceramic capacitor 100 may be electrically connected to the printed circuit board 210 by solders 231 and 232 in a state in which they are positioned to contact the first and second electrode pads 221 and 222, respectively.

As set forth above, according to exemplary embodiments in the present disclosure, the intermittent part connecting adjacent external electrodes to each other may be disposed on the surface of the ceramic body opposing the mounting surface of the ceramic body. In the case in which a short-circuit occurs in the multilayer ceramic capacitor, the intermittent part may be short-circuited to allow the circuit to be left in the open state, thereby preventing the over-current from being transferred to the circuits connected to the multilayer ceramic capacitor to prevent the overall product connected to the multilayer ceramic capacitor from being damaged.

While exemplary embodiments have been shown and described above, it will be apparent to those skilled in the art that modifications and variations could be made without departing from the scope of the invention as defined by the appended claims.

What is claimed is:

1. A multilayer ceramic capacitor comprising:
a ceramic body having a plurality of dielectric layers stacked in a width direction;

first and second external electrodes disposed on a mounting surface of the ceramic body to be spaced apart from each other in a length direction;

third and fourth external electrodes disposed on a surface of the ceramic body opposing the mounting surface to be spaced apart from each other in the length direction;

a first active layer including a plurality of first and second internal electrodes disposed in the ceramic body to be alternately exposed through the mounting surface of the ceramic body and the surface of the ceramic body opposing the mounting surface with respective dielectric layers interposed therebetween and connected to the first and third external electrodes, respectively;

a second active layer including a plurality of third and fourth internal electrodes disposed in the ceramic body to be alternately exposed through the mounting surface of the ceramic body and the surface of the ceramic body opposing the mounting surface with respective dielectric layers interposed therebetween and connected to the second and fourth external electrodes, respectively; and an intermittent part disposed on the surface of the ceramic body opposing the mounting surface and connecting the third and fourth external electrodes to each other.

2. The multilayer ceramic capacitor of claim 1, wherein the first and second internal electrodes include lead portions exposed through the mounting surface of the ceramic body and the surface of the ceramic body opposing the mounting surface, respectively, to correspond to each other in a thickness direction of the ceramic body, and the third and fourth internal electrodes include lead portions spaced apart from the lead portions of the first and second internal electrodes in the length direction and exposed through the mounting surface of the ceramic body and the surface of the ceramic body opposing the mounting surface, respectively, to correspond to each other in the thickness direction of the ceramic body.

3. The multilayer ceramic capacitor of claim 2, wherein the first and third external electrodes and the second and fourth external electrodes face each other in the thickness direction, respectively, the first internal electrode includes a first capacitance portion and a first lead portion extended from the first capacitance portion to be connected to the first external electrode, the second internal electrode includes a second capacitance portion overlapped with the first capacitance portion in the width direction and a second lead portion extended from the second capacitance portion to be connected to the third external electrode, the third internal electrode includes a third capacitance portion and a third lead portion extended from the third capacitance portion to be connected to the second external electrode, and the fourth internal electrode includes a fourth capacitance portion overlapped with the third capacitance portion in the width direction and a fourth lead portion extended from the fourth capacitance portion to be connected to the fourth external electrode.

4. The multilayer ceramic capacitor of claim 1, wherein the first and second internal electrodes include lead portions exposed through the mounting surface of the ceramic body and the surface of the ceramic body opposing the mounting surface, respectively, in positions adjacent to corners positioned diagonally on a cross-section of the ceramic body in a length-thickness direction, the third and fourth internal electrodes include lead portions exposed through the mounting surface of the ceramic body and the surface of the ceramic body opposing the mounting surface, respectively, in positions adjacent to corners positioned diagonally on the cross-section of the ceramic body in the length-thickness direction, and the lead portion of the first internal electrode and the lead portion of the fourth internal electrode are positioned to correspond to each other in a thickness direction of the ceramic body and the lead portion of the second internal electrode and the lead portion of the third internal electrode are positioned to correspond to each other in the thickness direction of the ceramic body.

5. The multilayer ceramic capacitor of claim 4, wherein the first and third external electrodes and the second and fourth external electrodes face each other in the thickness direction, respectively, the first internal electrode includes a first capacitance portion and a first lead portion extended from the first capacitance portion to be connected to the second external electrode, the second internal electrode includes a second capacitance portion overlapped with the first capacitance portion in the width direction and a second lead portion extended from the second capacitance portion to be connected to the third external electrode, the third internal electrode includes a third capacitance portion and a third lead portion extended from the third capacitance portion to be connected to the first external electrode, and the fourth internal electrode includes a fourth capacitance portion overlapped with the third capacitance portion in the width direction and a fourth lead portion extended from the fourth capacitance portion to be connected to the fourth external electrode.

6. The multilayer ceramic capacitor of claim 1, wherein the intermittent part is a fuse.

7. The multilayer ceramic capacitor of claim 1, wherein the intermittent part is a resistive pattern.

8. The multilayer ceramic capacitor of claim 1, wherein the first to fourth internal electrodes are spaced apart from both end surfaces of the ceramic body.

9. The multilayer ceramic capacitor of claim 1, wherein the first to fourth external electrodes are extended from the mounting surface of the ceramic body or the surface of the ceramic body opposing the mounting surface to portions of both side surfaces of the ceramic body.

10. A board having a multilayer ceramic capacitor, comprising:

a printed circuit board having first and second electrode pads disposed thereon; and the multilayer ceramic capacitor mounted on the printed circuit board, wherein the multilayer ceramic capacitor includes:

a ceramic body having a plurality of dielectric layers stacked therein in a width direction;

first and second external electrodes disposed on a mounting surface of the ceramic body to be spaced apart from each other in a length direction;

third and fourth external electrodes disposed on a surface of the ceramic body opposing the mounting surface to be spaced apart from each other in the length direction;

a first active layer including a plurality of first and second internal electrodes disposed in the ceramic body to be alternately exposed through the mounting surface of the ceramic body and the surface of the ceramic body opposing the mounting surface with respective dielectric layers interposed therebetween and connected to the first and third external electrodes, respectively;

a second active layer including a plurality of third and fourth internal electrodes disposed in the ceramic body to be alternately exposed through the mounting surface of the ceramic body and the surface of the ceramic body opposing the mounting surface with respective dielectric layers interposed therebetween and connected to the second and fourth external electrodes, respectively; and an intermittent part disposed on the surface of the ceramic body opposing the mounting surface of and connecting the third and fourth external electrodes to each other.

11. The board of claim 10, wherein the first and second internal electrodes include lead portions exposed through the mounting surface of the ceramic body and the surface of the ceramic body opposing the mounting surface, respectively, to correspond to each other in a thickness direction of the ceramic body, and the third and fourth internal electrodes include lead portions spaced apart from the lead portions of the first and second internal electrodes in the length direction and exposed through the mounting surface of the ceramic body and the surface of the ceramic body opposing the mounting surface, respectively, to correspond to each other in the thickness direction of the ceramic body.

12. The board of claim 11, wherein the first and third external electrodes and the second and fourth external electrodes face each other in the thickness direction, respectively, the first internal electrode includes a first capacitance portion and a first lead portion extended from the first capacitance portion to be connected to the first external electrode, the second internal electrode includes a second capacitance portion overlapped with the first capacitance portion in the width direction and a second lead portion extended from the second capacitance portion to be connected to the third external electrode, the third internal electrode includes a third capacitance portion and a third lead portion extended from the third capacitance portion to be connected to the second external electrode, and the fourth internal electrode includes a fourth capacitance portion overlapped with the third capacitance portion in the width direction and a fourth lead portion extended from the fourth capacitance portion to be connected to the fourth external electrode.

13. The board of claim 10, wherein the first and second internal electrodes include lead portions exposed through the mounting surface of the ceramic body and the surface of the ceramic body opposing the mounting surface, respectively, in positions adjacent to corners positioned diagonally on a cross-section of the ceramic body in a length-thickness direction, the third and fourth internal electrodes include lead portions exposed through the mounting surface of the ceramic body and the surface of the ceramic body opposing the mounting surface, respectively, in positions adjacent to corners positioned diagonally on the cross-section of the ceramic body in the length-thickness direction, and the lead portion of the first internal electrode and the lead portion of the fourth internal electrode are positioned to correspond to each other in a thickness direction of the ceramic body and the lead portion of the second internal electrode and the lead portion of the third internal electrode are positioned to correspond to each other in the thickness direction of the ceramic body.

14. The board of claim 13, wherein the first and third external electrodes and the second and fourth external electrodes face each other in the thickness direction, respectively, the first internal electrode includes a first capacitance portion and a first lead portion extended from the first capacitance portion to be connected to the second external electrode, the second internal electrode includes a second capacitance portion overlapped with the first capacitance portion in the width direction and a second lead portion extended from the second capacitance portion to be connected to the third external electrode, the third internal electrode includes a third capacitance portion and a third lead portion extended from the third capacitance portion to be connected to the first external electrode, and the fourth internal electrode includes a fourth capacitance portion overlapped with the third capacitance portion in the width direction and a fourth lead portion extended from the fourth capacitance portion to be connected to the fourth external electrode.

15. The board of claim 10, wherein the intermittent part is a fuse.

16. The board of claim 10, wherein the intermittent part is a resistive pattern.

17. The board of claim 10, wherein the first to fourth internal electrodes are spaced apart from both end surfaces of the ceramic body.

18. The board of claim 10, wherein the first to fourth external electrodes are extended from the mounting surface of the ceramic body or the surface of the ceramic body opposing the mounting surface to portions of both side surfaces of the ceramic body.

* * * * *